United States Patent
Plante et al.

(10) Patent No.: US 9,868,235 B2
(45) Date of Patent: Jan. 16, 2018

(54) COMPACTING AND INJECTION MOLD FOR A FIBER PREFORM FOR FABRICATING A TURBINE ENGINE GUIDE VANE MADE OF COMPOSITE MATERIAL

(75) Inventors: Romain Plante, Avon (FR); Lise Lacroix, Melun (FR); Olivier Patrigeon, Nanterre (FR); Jean-Pierre Cauchois, Obersteinbach (FR); Pascal Burek, Pulligny (FR)

(73) Assignee: SNECMA, Paris (FR)

( * ) Notice: Subject to any disclaimer, the term of this patent is extended or adjusted under 35 U.S.C. 154(b) by 1026 days.

(21) Appl. No.: 14/115,771

(22) PCT Filed: May 3, 2012

(86) PCT No.: PCT/FR2012/050983
§ 371 (c)(1),
(2), (4) Date: Jan. 29, 2014

(87) PCT Pub. No.: WO2012/153039
PCT Pub. Date: Nov. 15, 2012

(65) Prior Publication Data
US 2014/0197567 A1    Jul. 17, 2014

(30) Foreign Application Priority Data
May 10, 2011    (FR) .................................... 11 54017

(51) Int. Cl.
*B29C 45/00*    (2006.01)
*B29C 70/48*    (2006.01)
*B29D 99/00*    (2010.01)

(52) U.S. Cl.
CPC .......... *B29C 45/0005* (2013.01); *B29C 70/48* (2013.01); *B29D 99/0025* (2013.01)

(58) Field of Classification Search
CPC ....... B29C 70/40; B29C 70/42; B29C 70/443; B29C 70/446; B29C 70/44
(Continued)

(56) References Cited

U.S. PATENT DOCUMENTS

| | | | |
|---|---|---|---|
| 5,135,382 A | | 8/1992 | Tsuchiya et al. |
| 5,190,773 A | * | 3/1993 | Damon ................... B29C 43/32 |
| | | | 156/232 |

(Continued)

FOREIGN PATENT DOCUMENTS

| | | |
|---|---|---|
| EP | 0 446 851 | 9/1991 |
| EP | 0 770 463 | 5/1997 |

(Continued)

OTHER PUBLICATIONS

International Search Report dated Jul. 18, 2012 in PCT/FR12/050983 Filed May 3, 2012.

*Primary Examiner* — Christina Johnson
*Assistant Examiner* — Xue Liu
(74) *Attorney, Agent, or Firm* — Oblon, McClelland, Maier & Neustadt, L.L.P.

(57) ABSTRACT

A compacting and injection mold for a fiber preform is for use in fabricating a turbine engine guide vane out of composite material. The mold includes a shell forming a trough that is to receive the fiber preform and that is closed in leaktight manner by bottom and top covers, compacting blocks arranged inside the trough each having a surface pressing normally against a surface of the fiber preform that is to be compacted, and closure blocks arranged inside the trough. Each closure block has a surface pressing normally against a surface of a compacting block and does not have a surface in contact with the fiber preform.

6 Claims, 2 Drawing Sheets

(58) Field of Classification Search
USPC .................................................. 425/330, 394
See application file for complete search history.

(56) References Cited

U.S. PATENT DOCUMENTS

| | | | |
|---|---|---|---|
| 5,885,504 A | 3/1999 | David et al. | |
| 6,413,074 B1 * | 7/2002 | Hays | B29C 33/30 425/398 |
| 2003/0218267 A1 | 11/2003 | Husmann et al. | |
| 2011/0248416 A1 | 10/2011 | Mahieu et al. | |

FOREIGN PATENT DOCUMENTS

| | | |
|---|---|---|
| EP | 1 364 770 | 11/2003 |
| FR | 2 940 172 | 6/2010 |

* cited by examiner

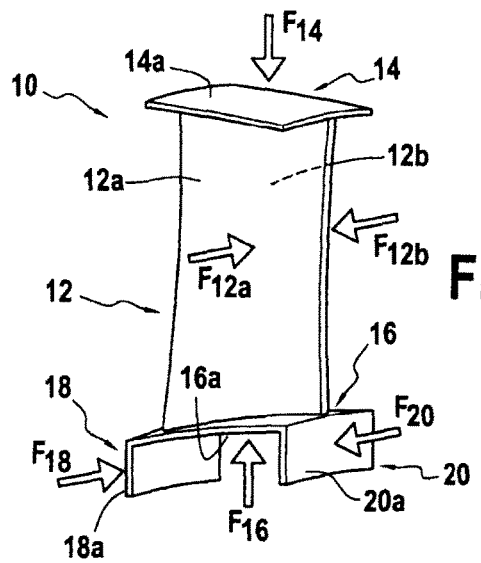
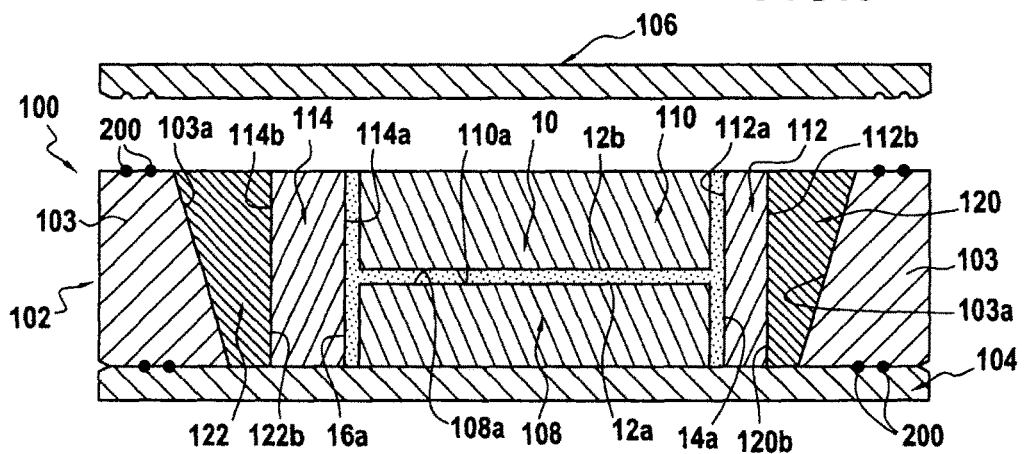
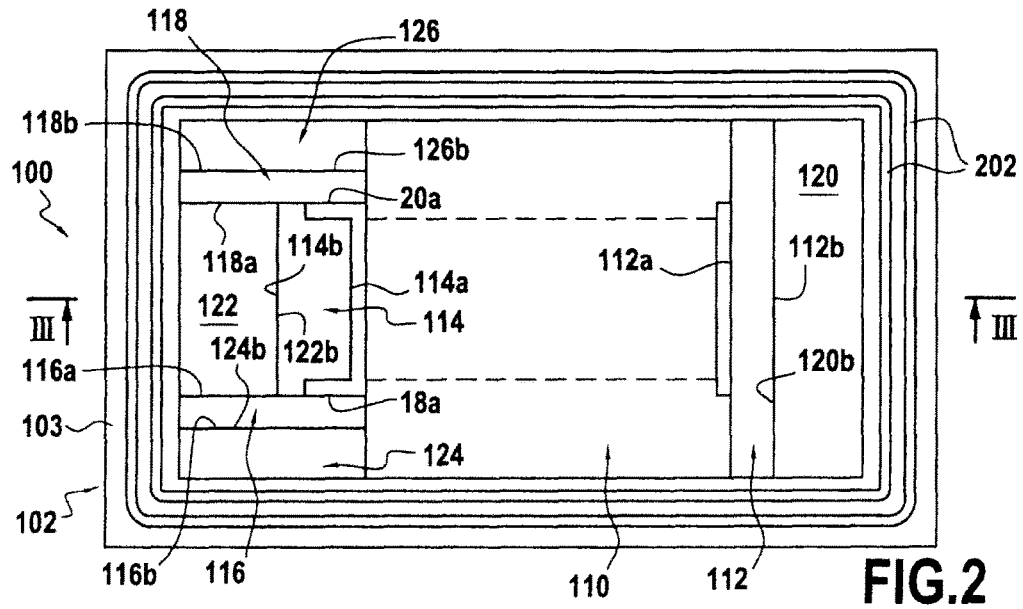

COMPACTING AND INJECTION MOLD FOR A FIBER PREFORM FOR FABRICATING A TURBINE ENGINE GUIDE VANE MADE OF COMPOSITE MATERIAL

BACKGROUND OF THE INVENTION

The present invention relates to the general field of fabricating a turbine engine guide vane out of composite material. A preferred field of application for the invention is that of outlet guide vanes (OGVs) of a low pressure compressor of an aviation turbine engine.

In conventional manner, a turbine engine guide vane made out of composite material is fabricated from a fiber preform (obtained by three-dimensional weaving or by draping a two-dimensional fabric), which preform is placed in a compacting and injection mold having an internal recess of shape and dimensions that correspond to the shape and dimensions of the finished molded part. Once the mold has been closed in leaktight manner, a thermosetting resin is injected throughout the recess in order to impregnate the preform, and the assembly is heated in order to polymerize the resin. After this polymerization step, the mold is opened and the finished molded part that is extracted therefrom forms a guide vane having the required shapes and dimensions for use.

The provision of a compacting and injection mold for that type of fabrication needs to comply with a certain number of constraints. Firstly, once the mold is closed it must be completely leaktight for the resin that is injected. Secondly, the fiber preform placed inside the mold must be compacted sufficiently and appropriately to ensure the final fiber content in the resulting part. It is known that during the making of a fiber preform, weaving leads to fibers expanding and creates extra thicknesses in the preform that need to be absorbed.

Proposals have been made for compacting and injection molds that satisfy such constraints. For example, a mold is known that is made up of a plurality of portions that are assembled and held together by bolts, each mold portion, after bolting, exerting a force on one of the surfaces of the fiber preform. Nevertheless, a turbine engine guide vane presents a shape that is geometrically rather complex, such that making such a mold for that type of part requires a large number of parts that are in practice complex to assemble together while also ensuring good leaktightness.

Another compacting and injection mold is known in which closure is obtained by means of a press exerting a force in a single direction, with force deflection columns connected to moving portions of the mold serving to exert compacting forces in various other directions. Nevertheless, the forces needed for compacting a part such as a turbine engine guide vane lead to the molds that are made being complex and not very reliable.

OBJECT AND SUMMARY OF THE INVENTION

A main object of the present invention is thus to mitigate such drawbacks by proposing a compacting and injection mold that is simple to use, that provides good compacting of the various faces of a part, that is as geometrically complex as a turbine engine guide vane, and that is reliably leaktight to resin.

In accordance with the invention, this object is achieved by a compacting and injection mold comprising a shell forming a trough that is to receive the fiber preform and that is closed by substantially plane bottom and top covers, compacting blocks arranged inside the trough, each having a surface pressing normally against a surface of the fiber preform that is to be compacted, and closure blocks arranged inside the trough, each closure block having a surface pressing normally against a surface of a compacting block and not having a surface in contact with the fiber preform.

The compacting blocks of the mold of the invention are caused to press normally (i.e. in a direction that is substantially perpendicular) against all of the surfaces of the fiber preform. In other words, each surface of the fiber preform that is to be compacted is associated with a compacting block that bears normally thereagainst. The closure blocks are interposed between the compacting blocks and the side walls of the trough in order to hold the compacting blocks pressed against the various surfaces of the fiber preform. The bottom and top covers serve to close the assembly and to provide good sealing against resin (between two plane surfaces) and they also facilitate subsequent unmolding of the assembly.

Separating the functions of the compacting blocks and of the closure blocks thus serves to facilitate making the mold, especially given the particular geometrical shape of the fiber preform for fabricating a turbine engine guide vane.

Preferably, the compacting blocks and the closure blocks present a coefficient of thermal expansion that is greater than that of the trough and of the covers. The presence of a thermal expansion differential enables the compacting mold to be closed while it is cold without completely compacting the fiber preform, with final compacting taking place when the mold is hot during the step of polymerizing the resin.

The trough may include side walls with inside surfaces that slope perceptibly relative to a plane normal to the bottom and top covers. This inclination makes it easier to put the closure blocks into place between the side walls of the trough and some of the compacting blocks.

Furthermore, when the fiber preform is for fabricating a turbine engine vane, the mold may comprise a first compacting block having a surface for pressing normally against a surface of the fiber preform constituting the pressure side of the airfoil of the vane, a second compacting block having a surface for pressing normally against a surface of the fiber preform constituting the suction side of the airfoil of the vane, a third compacting block having a surface for pressing normally against a surface of the fiber preform constituting the top platform of the vane, a fourth compacting block having a surface for pressing normally against a surface of the fiber preform constituting the bottom platform of the vane, and fifth and sixth compacting blocks having surfaces for pressing normally against respective surfaces of the fiber preform constituting upstream and downstream flanges of the vane.

Under such circumstances, at least one of the compacting blocks may be made up of at least two distinct portions in order to facilitate unmolding thereof.

Still under such circumstances, the mold may comprise a first closure block having a surface for pressing normally against a surface of the third compacting block remote from its surface pressing against the surface of the fiber preform constituting the top platform of the vane, a second closure block having a surface for pressing normally against a surface of the fourth compacting block remote from its surface pressing against the surface of the fiber preform constituting the bottom platform of the vane, and third and fourth closure blocks having surfaces for pressing normally against respective surfaces of the fifth and sixth compacting blocks remote from their surfaces pressing against the surfaces of the fiber preform constituting the upstream and downstream flanges of the vane.

The invention also provides a method of assembling a compacting and injection mold as defined above, the method consisting in the following successive steps: assembling the bottom cover in leaktight manner on the trough; positioning the fiber preform that is for use in fabricating a turbomachine part together with the compacting blocks inside the trough; positioning the closure blocks inside the trough; and assembling the top cover in leaktight manner on the trough.

Advantageously, presser devices for applying normal forces on the compacting blocks may be positioned inside the trough prior to positioning the closure blocks. These devices, which are removed immediately before putting the closure blocks into place, serve to assist in compacting the fiber preform.

Likewise, holder bars may advantageously be positioned on some of the compacting blocks prior to assembling the top cover on the trough, thereby also assisting in compacting the fiber preform before complete closure of the mold.

BRIEF DESCRIPTION OF THE DRAWINGS

Other characteristics and advantages of the present invention appear from the following description made with reference to the accompanying drawings, which show embodiments having no limiting character. In the figures:

FIG. 1 is a perspective view of a fiber preform for use in fabricating a guide vane for a turbine engine;

FIGS. 2 and 3 are respectively a plan view and a section view of a compacting and injection mold of the invention for receiving the FIG. 1 fiber preform.

DETAILED DESCRIPTION OF EMBODIMENTS

Figure 5:
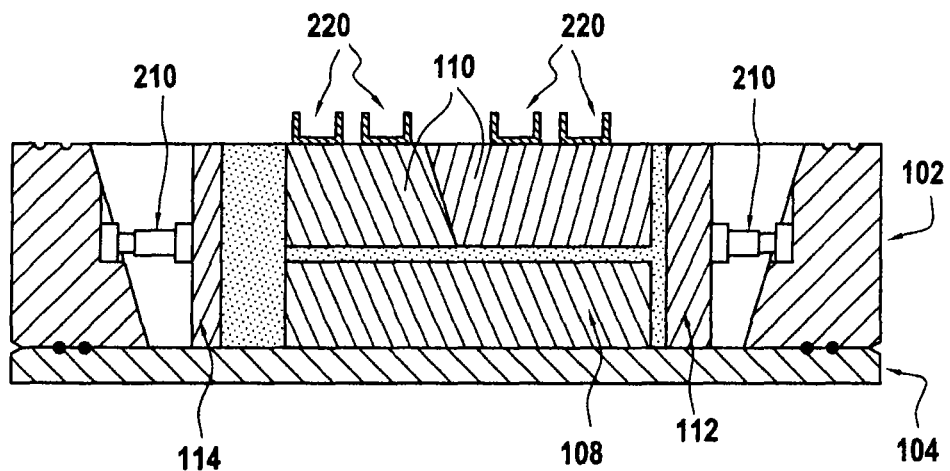
FIGS. 4 and 5 are respectively a plan view and a section view of a compacting and injection mold in a variant embodiment of the invention.

The invention is applicable to fiber preforms for use in fabricating various turbine engine parts out of composite material, for example a fiber preform 10 for use in making an outlet guide vane (OGV) of a low pressure compressor of an aviation turbine engine, such as that shown in FIG. 1.

In known manner, the fiber preform 10 of such a vane has a portion 12 constituting an airfoil, a portion 14 constituting a top platform that is formed at a radially outer end of the airfoil, a portion 16 constituting a bottom platform that is formed at a radially inner end of the airfoil, a portion 18 constituting an upstream flange extending the bottom platform upstream, and a portion 20 constituting a downstream flange extending the bottom platform downstream.

These various portions of the preform together define six surfaces that are to be compacted inside the mold prior to injecting resin, namely: the pressure side and suction side surfaces 12a and 12b of the portion 12 constituting the airfoil; the outer surface 14a of the portion 14 constituting the top platform; the inner surface 16a of the portion 16 constituting the bottom platform; and the upstream and downstream side surfaces 18a and 20a of the portions 18 and 20 constituting the upstream and downstream flanges.

More precisely, the forces to be applied inside the compacting mold must be directed along directions normal to these surfaces. By way of indication, they are represented in FIG. 1 by six respective arrows $F_{12a}$, $F_{12b}$, $F_{14}$, $F_{16}$, $F_{18}$, and $F_{20}$.

The fiber preform 10 as described in detail above may be obtained directly by three-dimensionally weaving yarns (e.g. made of carbon fibers) or by draping two-dimensional fiber fabrics. Once the preform has been made, it is placed inside a compacting and injection mold as described below. Thereafter, a thermosetting resin (e.g. of the epoxy family or of the bismaleimide family) is injected into the inside of the mold in order to impregnate the preform, and the assembly is heated in order to polymerize the resin. After this polymerization step, the mold is opened and the finished molded part that is extracted therefrom forms an outlet guide vane for a low pressure compressor, which vane has the shapes and the dimensions required for being used.

An embodiment of a compacting and injection mold of the invention is shown diagrammatically in FIGS. 2 and 3. For reasons of clarity, the circuits for delivering the resin to the inside of the mold are not shown.

The compacting and injection mold 100 comprises various assembled-together portions, in particular a trough-forming shell 102, a bottom cover 104, a top cover 106, compacting blocks 108 to 118, and closure blocks 120 to 126.

The trough 102 is substantially rectangular in shape with side walls 103. In association with the bottom cover 104 on which it is assembled in leaktight manner, it forms a container that receives the fiber preform 10 and the various compacting and closure blocks. The top cover 106 is assembled on the side walls 103 of the trough in order to close the mold in leaktight manner.

In this embodiment, there are six compacting blocks and each of them, when in position inside the mold, exerts a compacting force on one of the surfaces for compacting 12a to 20a of the fiber preform 10 in the various directions represented by the arrows $F_{12a}$, to $F_{20}$ in FIG. 1.

More particularly, a first compacting block 108 has a surface 108a that bears against the pressure side surface 12a of the portion of the preform constituting the airfoil, while a second compacting block 110 possesses a surface 110a that presses against the surface 12b of the portion of the preform constituting the suction side of the airfoil.

A third compacting block 112 has a surface 112a pressing against the surface 14a of the portion of the fiber preform constituting the top platform. Likewise, a fourth compacting block 114 has a surface 114a that presses against the surface 16a of the portion of the preform constituting the bottom platform.

Finally, fifth and sixth compacting blocks 116 and 118 present respective surfaces 116a and 118a that press against the surfaces 18a and 20a of the respective portions of the preform that constitutes the upstream and downstream flanges.

As a result, the set of surfaces for compacting 12a to 20a of the fiber preform 10 may be compacted by applying thrust to these compacting blocks along directions that are substantially perpendicular to said surfaces.

There are four closure blocks 120 to 126 in this embodiment and they serve to hold the compacting blocks pressed against the various surfaces of the fiber preform that are to be compacted. These closure blocks are interposed between the side walls 103 of the trough and the compacting blocks. When in place inside the mold, they therefore have no surfaces in contact with the fiber preform.

Thus, a first closure block 120 presents a surface 120b for pressing normally against a surface 112b of the third compacting block 112 that is opposite from its surface 112a. A second closure block 122 possesses a surface 122b for pressing normally against a surface 114b of the fourth compacting block 114 that is remote from its surface 114a. Finally, third and fourth closure blocks 124 and 126 present respective surfaces 124b and 126b for pressing normally against respective surfaces 116b and 118b of the fifth and sixth compacting blocks 116 and 118 that are remote from their surfaces 116a and 118a.

Such a mold may be assembled in the following order. Initially the trough 102 is mounted on the bottom cover 104 in leaktight manner, e.g. by means of gaskets 200 that are received in circumferential grooves 202 formed all around the trough. The first compacting block 108 is then positioned inside the trough substantially in its center. The fiber preform 10 is then placed inside the trough with its portion constituting the airfoil resting via its pressure side surface 12a on the surface 108a of the first compacting block. Thereafter, the other compacting blocks 110 to 118 are positioned one by one inside the trough so that their respective pressing surfaces press against the surfaces of the fiber preform that are to be compacted.

Once the compacting blocks have been properly positioned, the closure blocks are placed in turn in the trough between the side walls 103 of the trough and the compacting blocks. The top cover 106 of the mold is then assembled on the trough in order to close the mold in leaktight manner, e.g. by means of gaskets 200 received in grooves 202. The mold may then be connected to a resin delivery circuit in order to inject resin. Once the injection and polymerization steps have been performed, the mold is reopened and the finished part forming a vane having the final shapes and dimensions is extracted therefrom.

Various advantageous characteristics of the compacting and injection mold of the invention are described below.

In an advantageous arrangement of the invention, the compacting blocks 108 and 118 and the closure blocks 120 to 126 present a thermal expansion coefficient that is greater than that of the trough 102 and the covers 104, 106. As a result, the mold may be closed while it is cold without completely compacting the fiber preform, with final compacting taking place while the mold is hot during the step of polymerizing the resin.

It is thus possible to select materials having a low coefficient of thermal expansion for the trough and the covers (e.g. steel, invar, or a composite), and materials having a large coefficient of thermal expansion for the compacting blocks and the closure blocks (e.g. aluminum or silicone).

As shown in FIG. 3, the bottom surfaces 103a of the side walls 103 of the trough may slope relative to a plane normal to the bottom and top covers of the mold so as to facilitate inserting the closure blocks into the mold and also facilitate their extraction therefrom while unmolding.

Figure 4:
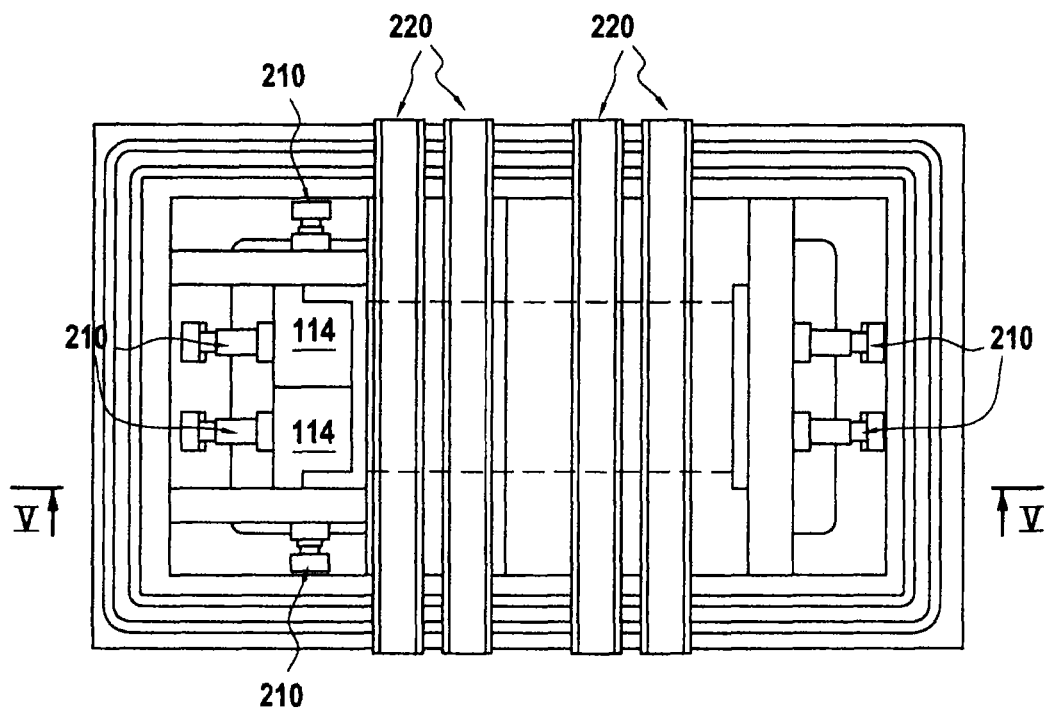

In the variant embodiment of FIGS. 4 and 5, the second compacting block 110 and the fourth compacting block 114 are each respectively made up of two distinct portions, thereby making them easier to unmold.

Still in this variant embodiment, prior to positioning the closure blocks, provision is made to arrange presser devices 210 inside the trough in order to apply normal forces on the compacting blocks 108 to 118. These devices 210 make it possible to assist compacting of the fiber preform in the mold prior to putting the closure blocks into place (the devices being removed immediately before the closure blocks are put into position).

Such devices, also referred to as spreaders, are screw-and-nut type systems having one end positioned in housings formed in the side walls 103 of the trough and an opposite end exerting force on the compacting blocks in a direction substantially perpendicular thereto. In the embodiment of FIGS. 4 and 5, there are six of these devices.

Likewise, still as shown in FIGS. 4 and 5, holder bars 220 may advantageously be positioned on some of the compacting blocks before assembling the top cover onto the trough, likewise for the purpose of assisting compacting of the fiber preform prior to complete closure of the mold.

Such holder bars 220 may for example be standard steel I-section beams as are commonly used in the building industry. They may merely be placed on the second compacting block 110.

The invention claimed is:

1. A compacting and injection mold for a fiber preform for use in fabricating a turbine engine part out of composite material, the mold comprising:
a shell forming a trough that is to receive the fiber preform and that is closed in a leaktight manner by substantially plane bottom and top covers, the top cover being assembled on side walls of the trough in order to close the mold in the leaktight manner;
compacting blocks arranged inside the trough each having a surface pressing normally against a surface of the fiber preform that is to be compacted; and
closure blocks arranged inside the trough, each closure block having a surface pressing normally against a surface of a compacting block and not having a surface in contact with the fiber preform.

2. The mold according to claim 1, wherein the compacting blocks and the closure blocks present a coefficient of thermal expansion that is greater than that of the trough and of the covers.

3. The mold according to claim 1, wherein inside surfaces of the side walls of the trough slope perceptibly relative to a plane normal to the bottom and top covers.

4. The mold according to claim 1, wherein the fiber preform is for fabricating a turbine engine vane including an airfoil having a pressure side and a suction side, a top platform at a radially outer end of the airfoil, and a bottom platform at a radially inner end of the airfoil, the bottom platform including an upstream flange at an upstream end thereof and a downstream flange at a downstream end thereof, and
wherein the compacting blocks include
a first compacting block having a surface for pressing normally against a surface of the fiber preform constituting the pressure side of the airfoil of the vane,
a second compacting block having a surface for pressing normally against a surface of the fiber preform constituting the suction side of the airfoil of the vane,
a third compacting block having a surface for pressing normally against a surface of the fiber preform constituting the top platform of the vane,
a fourth compacting block having a surface for pressing normally against a surface of the fiber preform constituting the bottom platform of the vane, and
fifth and sixth compacting blocks having surfaces for pressing normally against respective surfaces of the fiber preform constituting upstream and downstream flanges of bottom platform of the vane.

5. The mold according to claim 4, wherein at least one of the compacting blocks is made up of at least two distinct portions in order to facilitate unmolding thereof.

6. The mold according to claim 4, wherein the closure blocks include
a first closure block having a first surface for pressing normally against a surface of the third compacting block, and a second surface, remote from the first surface, for pressing against the surface of the fiber preform constituting the top platform of the vane, a second closure block having a first surface for pressing normally against a surface of the fourth compacting block, and a second surface, remote from the first surface, for pressing against the surface of the fiber preform constituting the bottom platform of the vane, a third closure block having a first surface for pressing normally against a surface of the fifth compacting block, and a second surface, remote from the first surface, for pressing against the surface of the fiber preform constituting the upstream flange of the bottom platform of the vane, and a fourth closure block having a first surface for pressing normally against a surface of the sixth compacting blocks, and a second surface, remote from the first surface, for pressing against the surface of the fiber preform constituting the downstream flange of the bottom platform of the vane.

* * * * *